United States Patent
Spencer et al.

(10) Patent No.: US 8,802,326 B2
(45) Date of Patent: Aug. 12, 2014

(54) FUEL CELL SEPARATOR PLATE

(75) Inventors: Steven J. Spencer, Rochester, NY (US); Seth D. Valentine, Wixom, MI (US); Courtney E. Reich, Rochester, NY (US); Daniel P Miller, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 627 days.

(21) Appl. No.: 12/952,678

(22) Filed: Nov. 23, 2010

(65) Prior Publication Data

US 2012/0129073 A1    May 24, 2012

(51) Int. Cl.
*H01M 8/04* (2006.01)
(52) U.S. Cl.
USPC .......................... 429/512; 429/514; 429/518
(58) Field of Classification Search
USPC .................................. 429/460, 512, 514, 518
See application file for complete search history.

(56) References Cited

U.S. PATENT DOCUMENTS

2004/0219410 A1   11/2004   Tanaka et al.

FOREIGN PATENT DOCUMENTS

| CN | 1638178 A | 7/2005 |
|---|---|---|
| CN | 101728548 A | 6/2010 |

OTHER PUBLICATIONS

Chinese Office Action dated Nov. 20, 2014; Applicant: GM Global Technology Operations LLC; Application No. 201110375661.9; 7 pages.

*Primary Examiner* — Jane Rhee
(74) *Attorney, Agent, or Firm* — BrooksGroup

(57) ABSTRACT

A fuel cell stack and a bipolar plate assembly is provided that may include straight-through tunnels to transport fluids from one side of a header seal to an opposite side of a header seal, fluidly connecting fuel cell stack reactant headers and bipolar plate reactant flow channels.

18 Claims, 4 Drawing Sheets

FUEL CELL SEPARATOR PLATE

TECHNICAL FIELD

The field to which this disclosure generally relates includes fuel cells and fuel cell stacks and, more particularly, reactant flow along fuel cell bipolar plates.

BACKGROUND

Hydrogen is an attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that may include an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through an electrical load to perform work before being sent to the cathode. The work can act in various ways to operate the vehicle.

Proton exchange membrane (PEM) fuel cells are one type of fuel cells that may be used in vehicles. A PEM fuel cell generally includes a solid polymer electrolyte proton-conducting membrane, such as a perfluorosulfonic acid membrane. The anode and cathode typically include finely divided catalytic particles, usually platinum, supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification and control of catalyst poisoning constituents, such as carbon monoxide.

Several fuel cells are typically combined into a fuel cell stack to generate the desired power. The fuel cell stack receives an anode input gas, typically a fuel such as hydrogen, that flows into the anode side of the stack. The fuel cell also receives a cathode input gas, typically a flow of compressed air. Not all of the oxygen in the cathode gas is consumed by the stack and some of the air is output as a cathode exhaust gas that may include water as a stack by-product.

The fuel cell stack may include a series of flow field plates or bipolar plate assemblies positioned between the several MEAs in the stack. The bipolar plates include an anode side and a cathode side for adjacent fuel cells in the stack. Anode gas flow channels may be provided in the anode side of the bipolar plates that allow the anode gas to flow to the anode side of each MEA. Cathode gas flow channels may be provided in the cathode side of the bipolar plates that allow the cathode gas to flow to the cathode side of each MEA. The bipolar plates are generally made of and/or have surfaces made of a conductive material, such as stainless steel or other conductive material, so that they conduct the electricity generated by the fuel cells from one cell to the next cell as well as out of the stack.

The fuel cells of the fuel cell stack may receive and release reactant gases and/or other fuel cell fluids via various reactant headers. A reactant header may run alongside or within the length of the fuel cell stack to distribute or receive reactant gases to or from each individual fuel cell in a parallel arrangement.

Various configurations have been developed to transport fuel cell fluids such as gaseous fuels, reactants, and reactant by-products to and from reactant headers and fuel cell reactant flow channels.

SUMMARY

According to one embodiment, a product may comprise a fuel cell stack. The fuel cell stack may include a plurality of adjacent bipolar plates and a reactant header. The reactant header may include a first header opening in each of the bipolar plates and a header seal disposed between each adjacent bipolar plate and circumscribing each of its adjacent first header openings. Each bipolar plate may further include reactant flow channels and a first tunnel region fluidly connecting the reactant flow channels and the reactant header. At least one of the first tunnel regions may include a straight-through tunnel.

According to another embodiment, a product may comprise a bipolar plate. The bipolar plate may include stamped anode and cathode reactant plates. Each reactant plate may include reactant flow channels and a header opening aligned with the header opening of the other reactant plate. The bipolar plate may further include a tunnel region located between the aligned header openings and the reactant flow channels. The tunnel region may include one or more tunnels. All of the tunnels of the bipolar plate may be formed in only one of the reactant plates.

According to another embodiment, a product may comprise a fuel cell stack. The fuel cell stack may include a plurality of adjacent bipolar plates and a plurality of reactant headers. Each reactant header may include a plurality of adjacent header openings that are formed through each adjacent bipolar plate and header seals disposed between each adjacent bipolar plate and circumscribing their adjacent header openings. A portion of each header seal may be located in a tunnel region of each adjacent bipolar plate. Each header seal of each reactant header may be aligned with one another in the stack direction.

Other exemplary embodiments will become apparent from the detailed description provided herein. It should be understood that the detailed description and specific examples, while disclosing specific exemplary embodiments, are intended for purposes of illustration only and are not intended to limit the scope of the claimed inventions.

DETAILED DESCRIPTION OF EXEMPLARY EMBODIMENTS

The following description of the embodiment(s) is merely illustrative in nature and is in no way intended to limit the claimed inventions, their applications, or uses.

A fuel cell stack may include a plurality of bipolar plates disposed adjacent one another with adjacent bipolar plates having membrane electrode assemblies (MEAs) disposed therebetween. Bipolar plates may be formed in a variety of shapes, sizes, and configurations, but are generally electrically conductive components that may include anode and cathode reactant flow channels on opposite sides. Some bipolar plates are bipolar plate assemblies that may include more than one component. For example, a bipolar plate assembly may include a pair of reactant plates attached together. The pair of reactant plates may include an anode reactant plate and a cathode reactant plate.

Bipolar plates and/or their individual components may be formed using a variety of techniques, including but not limited to casting, machining, molding, forming and/or stamping processes. Skilled artisans will appreciate that stamping is one method of forming materials into desired shapes, but that other known techniques may be used to form materials into shapes typically formed by stamping processes. As used herein, the descriptive term "stamped" is used to describe any structure that can be formed by a stamping process but also describes any structure that includes features generally characteristic of stamping processes, such as generally consistent material thickness and/or complimentary shapes being present on both sides of the material (such as an emboss in one surface of the material that is also a deboss in the opposite surface of the material).

Bipolar plates may also include coolant flow channels. Bipolar plate assemblies that include stamped reactant plates may include coolant flow channels formed between the assembled reactant plates, the flow channels being formed at least partially by the opposite side of the reactant flow channels of each reactant plate.

Figure 1:
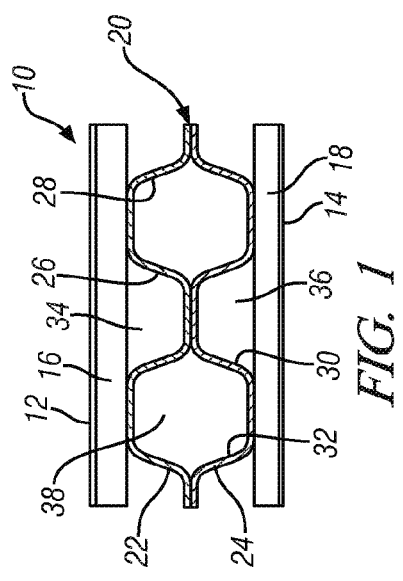
FIG. 1 is a partial cross-sectional view of an exemplary fuel cell stack.

FIG. 1 is a partial cross-section through one embodiment of a fuel cell stack 10 that includes a bipolar plate assembly 20. The fuel cell stack 10 may include two MEAs 12 and 14 for adjacent fuel cells in the stack 10. Each MEA 12 and 14 may include an electrolyte membrane, an anode side catalyst layer, and a cathode side catalyst layer. An anode side gas diffusion media (GDM) layer 16 may be positioned adjacent the MEA 12, and a cathode side GDM layer 18 may be positioned adjacent the MEA 14. The GDM layers 16 and 18 may be porous layers that provide for input gas transport to and water transport from the MEAs 12 and 14. Various techniques are known in the art for depositing the catalyst layers on the membranes of the MEAs 12 and 14 and/or on the GDM layers 16 and 18.

Bipolar plate assembly 20 may be positioned between the GDM layers 16 and 18. The bipolar plate assembly 20 may include an anode reactant plate (or anode side) 22 and a cathode reactant plate (or cathode side) 24. In one embodiment, the reactant plates and any features included therein may be formed by a stamping process or otherwise manufactured to form stamped reactant plates. The anode plate 22 may include a reactant side 26 and a coolant side 28. The cathode plate 24 may also include a reactant side 30 and a coolant side 32. The reactant plates 22 and 24 may at least partially define generally parallel anode gas flow channels 34 and generally parallel cathode gas flow channels 36. The anode flow channels 34 may provide a hydrogen flow to the anode side of the MEA 12, and the cathode flow channels 36 may provide air or oxygen flow to the cathode side of the MEA 14. Reactant plates 22 and 24 may at least partially define coolant flow channels 38 located between the reactant plates through which a cooling fluid can flow to help cool or otherwise control the temperature of the fuel cell stack 10 and its various components.

Figure 2:
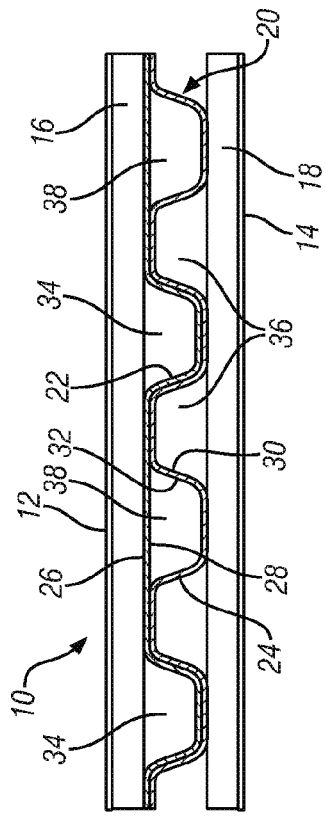
FIG. 2 is a partial cross-sectional view of an exemplary fuel cell stack having nested reactant plates.

FIG. 2 shows a partial cross-section through another embodiment of fuel cell stack 10 that includes a bipolar plate assembly 20, where like features are identified with like numerals from the embodiment of FIG. 1. In this exemplary embodiment, reactant plates 22, 24 are disposed adjacent one another in a nested configuration, but the fuel cell stack otherwise may include many of the same components and features as the embodiment shown and described in FIG. 1. A nested configuration such as that shown in FIG. 2 may be used in an active region of a fuel cell (the active region may generally lie within the same projected area of the fuel cell as the MEAs). As illustrated, a nested configuration can reduce the overall thickness of an individual fuel cell when compared to a non-nested configuration such as that shown in FIG. 1 and may thereby reduce the overall fuel cell stack height or thickness as well. Of course, this is only one example of a bipolar plate nested configuration, and others are possible. Any bipolar plate, whether nested or non-nested, stamped or otherwise formed, may benefit from the teachings presented herein.

Not shown in the figures, but optionally included in the fuel cell stack, are subgaskets that, along with the MEAs and/or the GDM layers, may be disposed between adjacent bipolar plates 20 in the fuel cell stack 10. A typical subgasket is shaped or configured generally to ensure that conductive components of adjacent bipolar plates do not come into contact with one another. In the active region of adjacent bipolar plates, MEAs and GDMs may separate the bipolar plates from one another, while the subgasket may separate the bipolar plates from one another in other (non-active) areas of the bipolar plates. The subgaskets may be formed from non-conductive and/or impermeable materials, such as certain polymeric materials. In one embodiment, the subgaskets may be constructed from a polyimide-based material such as Kapton®, but may also be made from a variety of suitable polymeric and/or non-polymeric materials. The subgasket may include or be in the form of a film having a thickness in the range from about 25 to about 75 μm. It may generally be in the shape of its adjacent bipolar plates with a cut-out in the area of the MEA and/or GDM and other cutouts corresponding to header openings in the bipolar plates, for example.

In any of the above embodiments, and in other embodiments, the anode flow channels 34 may be in fluid communication with an anode header at each end of the bipolar plates of the fuel cell stack 10, where one anode header may receive the anode gas flow to distribute it to the anode gas flow channels 34, and the other anode header may receive the anode exhaust gas from the anode flow channels. Likewise, the cathode gas flow channels 36 may be in fluid communication with a cathode header at each end of the bipolar plates of the stack 10, and the cooling flow channels 38 may be in fluid communication with a coolant header at each end of the bipolar plates of the stack 10.

Figure 3:
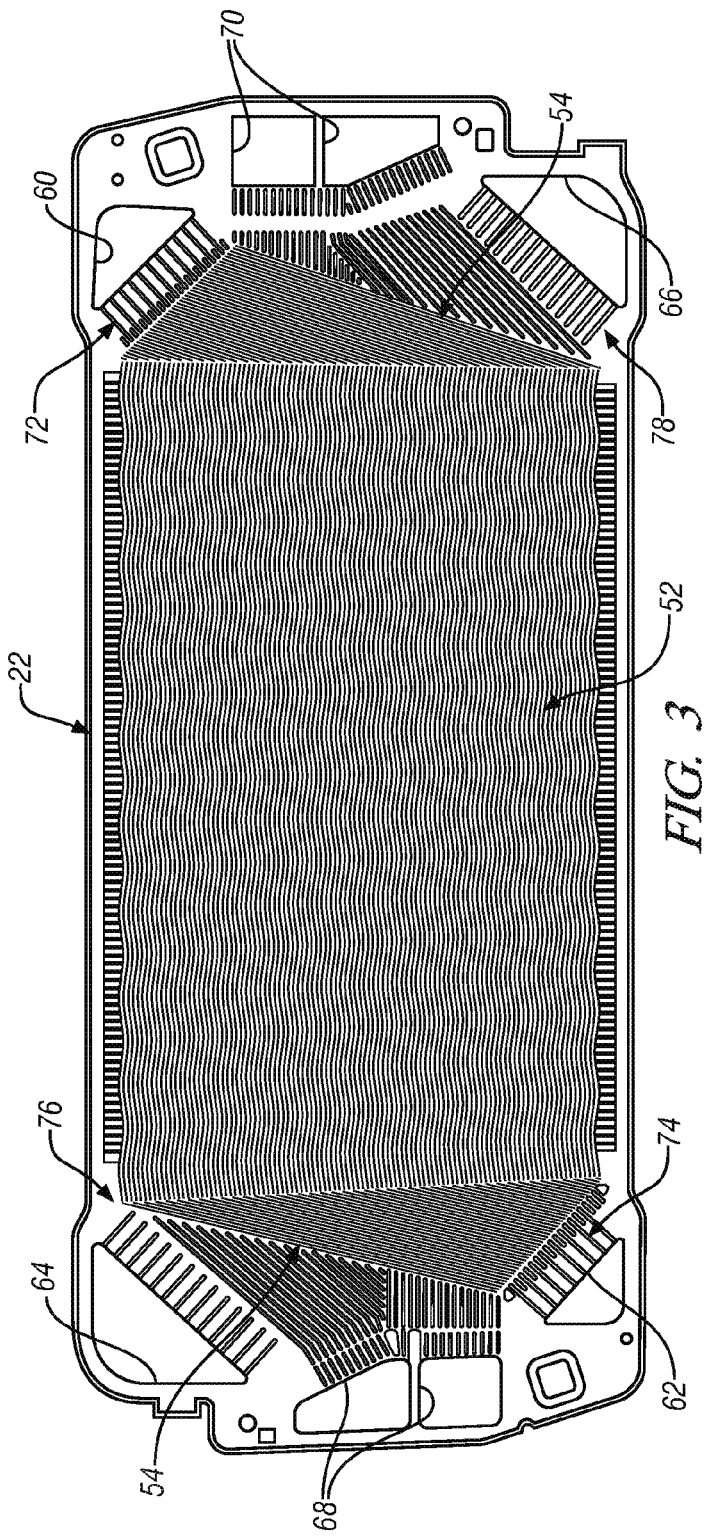
FIG. 3 is a plan view of a reactant side of an exemplary reactant plate of a bipolar plate having tunnel regions, according to one embodiment.
Figure 4:
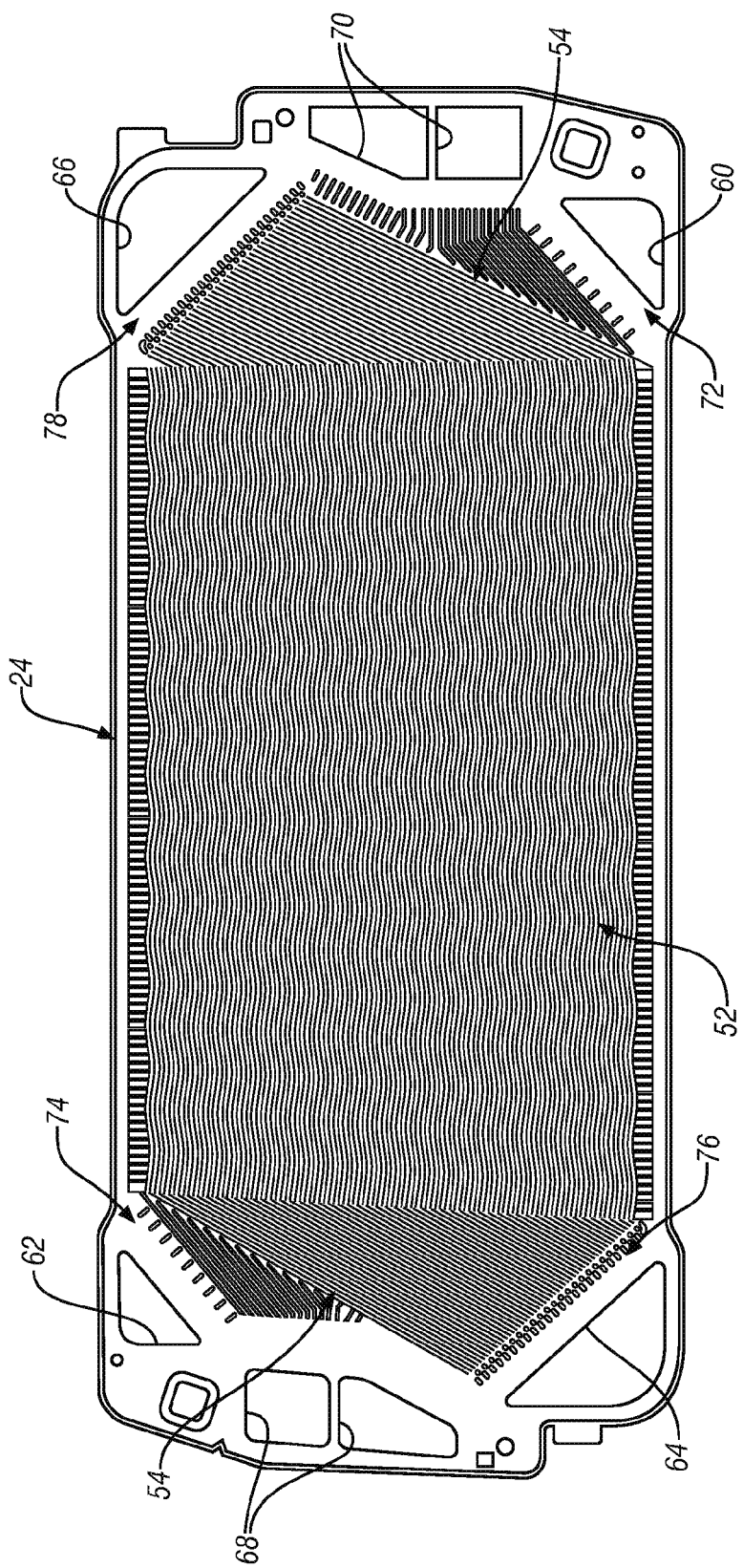
FIG. 4 is a plan view of a reactant side of an exemplary reactant plate of a bipolar plate having tunnel regions, according to another embodiment.

FIGS. 3 and 4 show plan views of the reactant sides of exemplary anode and cathode reactant plates 22 and 24, respectively, each including an active region 52, non-active regions 54, header openings 60-70, and tunnel regions 72-78. Reactant plates 22 and 24 may be attached together, by welding or other suitable means, with their respective reactant sides facing away from one another to form a bipolar plate assembly that may further include coolant flow channels formed between the reactant plates 22, 24. Some of the flow channels may have a nested configuration consistent with the discussion above, but this is not necessary.

Active region 52 may be generally rectangular in shape, corresponding to the size and shape of the MEAs that will be disposed adjacent the bipolar plate assembly in the fuel cell stack, and may include anode and cathode reactant flow channels 34 and 36 formed in respective reactant plates 22 and 24. Non-active regions 54 may be located at opposite ends of each reactant plate, as shown. These regions may also be known as feed regions because they may include portions of reactant flow channels 34 and 36 and may feed reactant fluids to and carry reactant fluids away from the active region 52 during fuel cell operation.

Header openings 60-70 may include anode header openings 60, 62; cathode header openings 64, 66; and coolant header openings 68, 70. Anode header openings 60, 62 may include an anode inlet header opening 60 and an anode outlet header opening 62, respectively. Cathode header openings 64, 66 may include a cathode inlet header opening 64 and a cathode outlet header opening 64, respectively. Coolant header openings 68, 70 may include coolant inlet header openings 68 and coolant outlet header openings 70, respectively. Inlet header openings 60, 64, and 68 and outlet header openings 62, 66, and 70 may be located at opposite ends of each reactant plate.

Generally, like header openings may be generally aligned with one another when the reactant plates are assembled into bipolar plate assemblies and when the bipolar plate assemblies are assembled into the fuel cell stack. Adjacent bipolar plate assemblies in the fuel cell stack may have header seals disposed therebetween that may circumscribe each adjacent header opening. Taken together, like header openings of adjacent or consecutive bipolar plate assemblies in the fuel cell stack, along with the header seals corresponding to each, may at least partially define reactant headers for the fuel cell stack. For example, a series of anode inlet header openings 60 generally aligned with one another in the fuel cell stack, along with the header seals disposed between adjacent bipolar plate assemblies 20 and circumscribing each adjacent anode inlet header opening 60, may form an anode inlet header of the fuel cell stack 10.

Similar descriptions apply to anode outlet headers, cathode inlet and outlet headers, and coolant inlet and outlet headers. Such reactant inlet headers may run the length of the fuel cell stack to provide reactant gases, such as hydrogen fuel or oxygen-containing gases, to the individual fuel cells in a parallel arrangement. Likewise, such reactant outlet headers may run the length of the fuel cell stack to remove reactant or by-product gases, such as excess hydrogen fuel, excess oxygen-laden gases, or water by-products, from the individual fuel cells in a parallel arrangement. Coolant headers operate in a similar fashion, providing and removing coolant from the individual fuel cells in a parallel fashion.

As shown with the exemplary arrangement of header openings in FIGS. 3-4, bipolar plate assemblies may have a counter-flow arrangement. That is, anode gases flow in one direction across the anode reactant plate 22, and cathode gases flow in the opposite direction across the cathode reactant plate 24. In other embodiments, the header openings may include a co-flow arrangement in which anode and cathode gases flow across the bipolar plate in the same direction. As shown, the coolant fluid and cathode fluid are in a co-flow arrangement, but other arrangements are possible.

Of course, in order for the anode and cathode gases to make their way across the surfaces of the bipolar plates from the inlet headers to the outlet headers via their respective reactant flow channels 34 and 36, the gases must first be transported beyond the respective header seals; i.e., from a header side of the seals to a flow channel side of the seals on the inlet side, and from the flow channel side of the seals to the header side of the seals on the outlet side.

Tunnel regions 72-78 may fluidly connect the reactant headers of the fuel cell stack with their appropriate reactant flow channels 34, 36 to transport reactant fluids from one side of the respective header seals to the other. Tunnel region 72 may be located between anode inlet header opening 60 and anode flow channels 34, and tunnel region 74 may be located between anode outlet header opening 62 and flow channels 34. Tunnel region 76 may be located between cathode inlet header opening 64 and cathode flow channels 36, and tunnel region 78 may be located between cathode outlet header opening 66 and flow channels 36. As shown in this embodiment, the tunnel regions may be in fluid communication with the non-active regions of the bipolar plate assembly. But other embodiments may include direct fluid communication between fuel cell stack headers and active regions of the bipolar plate via the tunnel regions.

Several competing factors may help determine the configuration of the tunnel regions. One factor may be that the tunnel regions minimize any restriction on fluid flow, thereby minimizing pressure losses in the fuel cell stack. Another factor may be that the tunnel regions be insensitive to stamping or other manufacturing tolerances, thereby enabling reliable performance and allowing the use of less costly manufacturing techniques. Yet another consideration may be that pinning points for water accumulation be minimized to provide better low power and freeze performance and to minimize reactant flow channel blockage that may be caused, particularly on the cathode side, by water pinned in the tunnel regions. As disclosed herein, one way to reduce pinning points is to configure tunnel regions such that they exist in as few elevation levels of the fuel cell stack as possible (the levels existing in the stack direction); i.e., the path the fluids must take to get from one side of the header seal to the other should have as few elevation changes or other fluid direction changes as possible.

Figure 5:
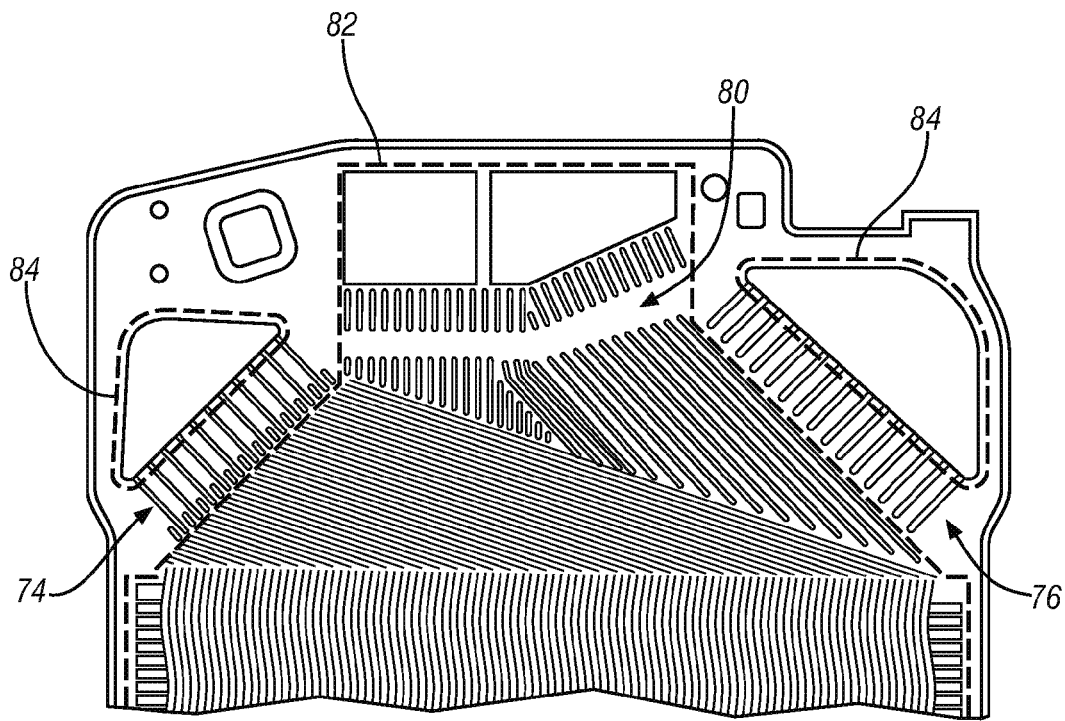
FIG. 5 is an enlarged view of a portion of the exemplary reactant plate of FIG. 3, showing exemplary seal locations.

Referring now to FIG. 5, the tunnel regions, for example regions 74 and 76, as shown, may reside laterally outside a sealed coolant area 80 that is inclusive of the coolant flow channel areas between the reactant plates and the coolant header openings 68, in this example. The seal that defines the sealed coolant area is shown as dashed line 82. The seal 82 may be formed between the anode and cathode reactant plates of bipolar plate assembly 20 and may include or be formed from a continuous weld, an adhesive, an elastomeric or other type of gasket, or any other suitable seal. FIG. 5 also shows exemplary locations of header seals 84. Header seals 84 may circumscribe their respective header openings and may include a portion lying in one of the tunnel regions. Header seals 84 may take a variety of forms including pre-formed gaskets and/or cure-in-place (CIP) elastomeric materials such as silicone-based materials, UV-curable materials, or other materials. A cure-in-place material may be applied in the form of a viscous liquid that can flow to conform to the shape or shapes of the tunnels that it may be applied over before it cures. Generally, pre-formed gaskets may also include corresponding relief areas to accommodate various tunnel region features described below, or be constructed from materials of a suitably low durometer to conform with such tunnel region features. CIP materials may be deposited onto the desired anode and/or cathode side of individual bipolar plates to be assembled into a fuel cell stack. The CIP materials may be allowed to cure prior to fuel cell stack assembly, but it is possible to form wet seals that may be allowed to cure after stack assembly. Of course, these are only some examples of seals and seal locations. Other seals may be included between bipolar plate halves and/or between adjacent plates in the stack. For example, additional header seals (not shown) may be provided that circumscribe the coolant header openings to isolate coolant flow, keeping it within coolant headers and coolant flow channels and away from the reactant flow channels and the atmosphere. Similarly, additional seals (not shown) may be included between the reactant plates of a given bipolar plate assembly located around each reactant header opening to isolate reactant gases from the atmosphere.

Figure 6:
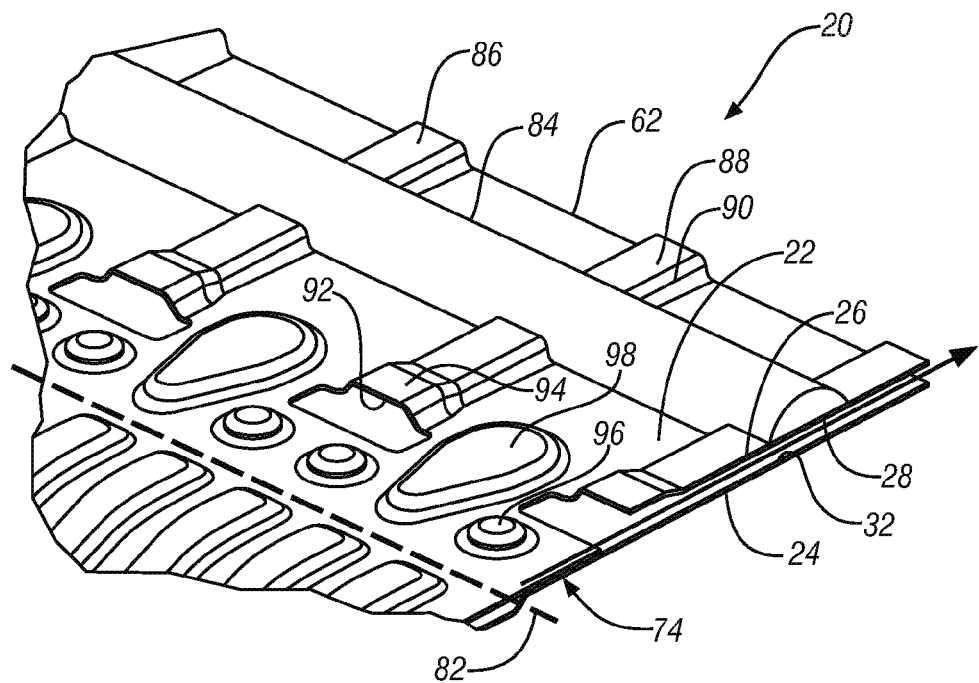
FIG. 6 is a sectioned perspective view of an exemplary bipolar plate tunnel region, according to one embodiment.

Referring now to FIG. 6, a portion of an exemplary tunnel region is shown. The particular tunnel region shown in this example is shown from the anode side of an exemplary bipolar plate assembly 20 that includes the exemplary anode and cathode reactant plates of FIGS. 3 and 4 attached to one another. In tunnel region 74, coolant sides 28, 32 of the anode and cathode reactant plates 22, 24 may be disposed generally closely adjacent to and opposing one another. One or more tunnels 86 may be formed in preferably only one of the reactant plates. In the depicted embodiment, tunnels 86 are formed only in the anode plate 22 in the form of elongated dimples, while the adjacent portions of the cathode plate 24 are substantially flat or planar. However, the tunnels 86 may alternatively be formed only in the cathode plate 24 or in both plates 22, 24.

The arrow shown in FIG. 6 indicates the direction of fluid flow from the reactant flow channel side of seal 84 to the header side of the seal toward anode outlet header opening 62 and its corresponding header. Tunnels 86 may be straight-through tunnels, as shown, meaning that they proceed "straight through" the header seal 84 with no elevation change. A similar, or in some embodiments an identical, configuration may be utilized in tunnel region 72, adjacent to the anode inlet header such that the fluid flow would be in the opposite direction through the tunnel region. Indeed, it may be useful to utilize identical tunnel region configurations adjacent the inlet and outlet headers for symmetry so that the anode and cathode plates may be assembled into a bipolar plate having the same configuration even if one of the reactant plates is rotated by 180 degrees. And a bipolar plate assembly so constructed may be assembled into a fuel cell stack when rotated by 180 degrees without altering the structure of the stack. Utilizing identical tunnel regions adjacent the inlet and outlet header openings may also be useful in balancing fluid flow into and out of the respective fuel cells. Furthermore, the configuration of FIG. 6 may be utilized in other tunnel regions, such as those adjacent cathode inlet and outlet header openings.

Exemplary tunnels 86 may have a generally flat top 88 with inclined sides 90 as shown, but tunnels 86 may take any number of shapes or forms. A port 92 may be formed in the anode plate 22 to facilitate fluid flow into (or out of) the tunnel 86. Stated another way, port 92 may facilitate fluid flow from the reactant side 26 of the anode plate 22 to the coolant side 28 of the anode plate 22 (or vice versa) and thereby through or beneath seal 84. The tunnel may include an enlarged portion 94 adjacent the port 92, as shown. Enlarged portion 94 may help to prevent other fuel cell components such as a subgasket from intruding on or blocking ports 92, and/or it may be designed with particular cross-sections that improve the overall fluid flow in the fuel cell. Port 92 may transversely cross tunnel 86, as shown, and may extend in the anode plate 22 beyond the width of tunnel 86. The tunnel region may also include support features 96, 98. The support features may be in the form of dimples or mounds and have various shapes and sizes, such as small circular features 96 and/or relatively larger tear drop-shaped features 98, the latter of which may extend between adjacent tunnels 86 as shown. The support features may generally be located near and arranged about the ports 92 and may help minimize or prevent any blockage of the ports by other layers of the fuel cell such as a subgasket, electrolyte membrane, shim, or other component in the tunnel region.

Seal 84 may include a portion located in the tunnel region and across the tunnels 86 and may continue to circumscribe its respective header opening, anode outlet header opening 62, in this case. As discussed previously, seal 84 may be formed by dispensing, molding, printing or otherwise fitting it to the plate. Seal 84 may also be in the form of a pre-formed gasket that is die-cut, molded, etc. that may or may not include cut-outs or recesses to accommodate tunnels 86.

In the embodiment of FIG. 6, in which tunnels 86 are formed in only one of the reactant plates, plate assembly tolerance is desensitized. In other words, tunnels 86 in this exemplary configuration do not have to be aligned with any particular feature of the other reactant plate during bipolar plate assembly. The straight-through tunnel configuration depicted in FIG. 6 may be useful for several reasons, including minimized pressure losses, minimized water pinning points, and reduced overall tunnel region size, to name a few. Such a tunnel region configuration may also be useful with low-profile bipolar plate configurations such as those having nested reactant plates because the straight-through configuration may have a smaller overall height or thickness than previously known tunnel configurations that usually included multiple elevation changes and therefore required increased space in the thickness direction of the fuel cells and in the length direction of the bipolar plates.

Another feature of the tunnel regions shown in this and other embodiments disclosed herein is header seal alignment, as will be further shown and described below in conjunction with FIGS. 7-9, for example. Such straight-through tunnel configurations, unlike previously known tunnel configurations having multiple elevation changes, may facilitate consecutive header seals, such as seals 84, to be generally aligned with one another in the stack direction. Prior known tunnel configurations oftentimes required header seals to be staggered from one bipolar plate in a stack to the next to enable constant height along the full continuous seal. Staggered header seals are sometimes known to cause difficulty in uniformly transferring seal loads to adjacent plates in the stack. Such non-uniform load distribution can lead to imperfect seals, as well as potential electrical shorting between adjacent bipolar plates. The straight-through tunnel configurations disclosed herein may allow header seals to be aligned with one another for a more uniform load distribution in the stack when it is assembled and compressed.

Figure 7:
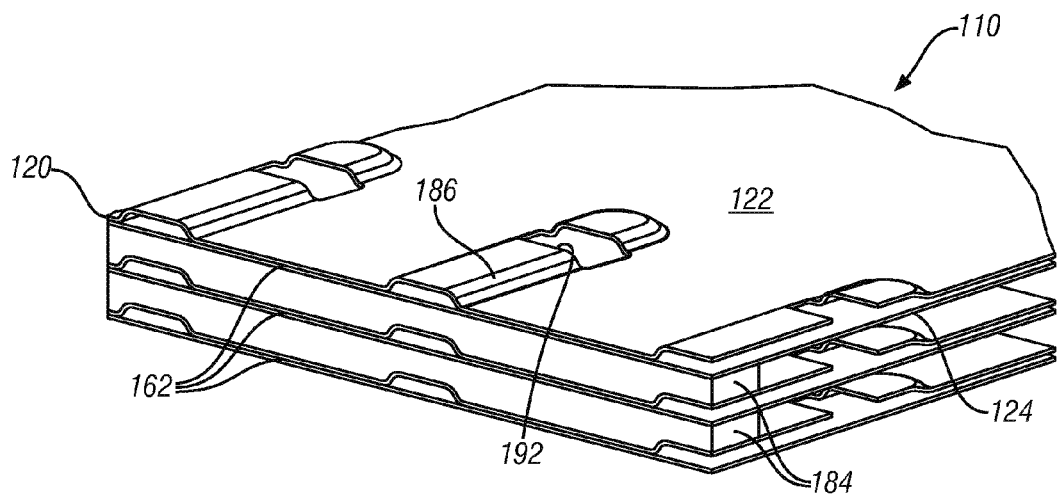
FIG. 7 is a sectioned perspective view of an exemplary fuel cell stack showing exemplary tunnel regions having aligned tunnels.

FIG. 7 illustrates another exemplary embodiment of a bipolar plate tunnel region that includes straight-through tunnels, where 100 has been added to element numerals that are used to denote like features from previously discussed embodiments. The portion of the exemplary fuel cell stack 110 shown may include a plurality of bipolar plate assemblies 120 that include tunnel regions. As with the embodiment of FIG. 6, the tunnel regions shown are adjacent anode outlet header openings 162, but such tunnel configuration may of course be used adjacent other header openings. Each bipolar plate assembly 120 may include anode and cathode reactant plates 122, 124. Tunnels 186 are formed in anode plate 122, while the adjacent portion of cathode plate 124 is flat. As discussed previously, tunnels 186 may be alternatively formed in the cathode plate 124 or in both reactant plates. Ports 192 may be formed in the anode plate 122 to facilitate fluid flow from the reactant side of the anode plate 122 to the coolant side of the anode plate 122 (or vice versa) and therefore through or beneath seal 184. Port 192 may transversely cross the tunnel 186, as shown, and extend in the anode plate 122 beyond the width of tunnel 186. In this embodiment, port 192 is located somewhere along the length of the tunnel 186, between ends, rather than at an end of the tunnel as was the case with the embodiment of FIG. 6. The tunnel region may also include support features located near and arranged about port 192, but they are not shown here. Other fuel cell stack components have also been omitted in the figure for clarity. In this embodiment, tunnels 186 that are formed in consecutive or adjacent bipolar plates in the stack are generally aligned with one another in the stack direction, and the straight-through tunnel configuration may allow for aligned header seals 184 from plate to plate in the stack.

Figure 8:
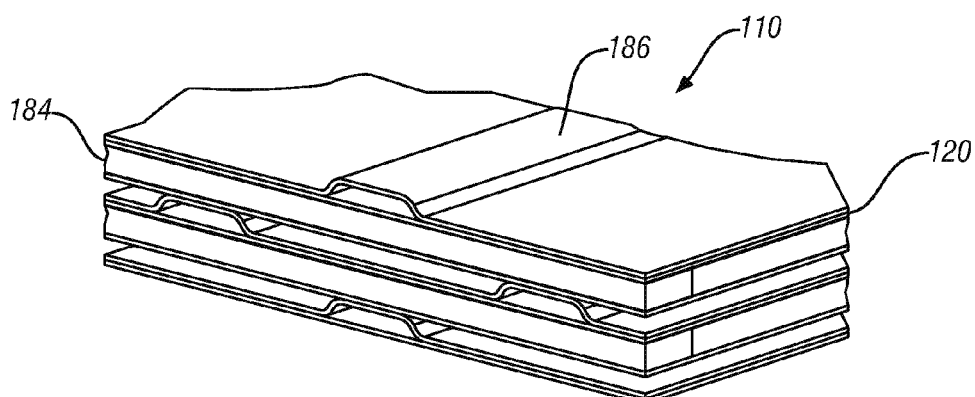
FIG. 8 is a sectioned perspective view of an exemplary fuel cell stack showing exemplary tunnel regions having staggered tunnels.

FIG. 8 illustrates an alternative exemplary embodiment of the portion of fuel cell stack 110 of FIG. 7. In this particular figure, seals 184 have not yet been compressed to conform to their respective tunnels 186. In this embodiment, the tunnels 186 of consecutive bipolar plates in the stack are staggered in relation to one another in the stack direction, while consecutive seals 184 in the stack remain aligned with one another. Such a staggered configuration for the tunnels may be useful to better distribute compression loads in the respective seals 184 and may also be beneficial for expelling liquid water into the header and for uniform distribution of reactant gases.

Figure 9:
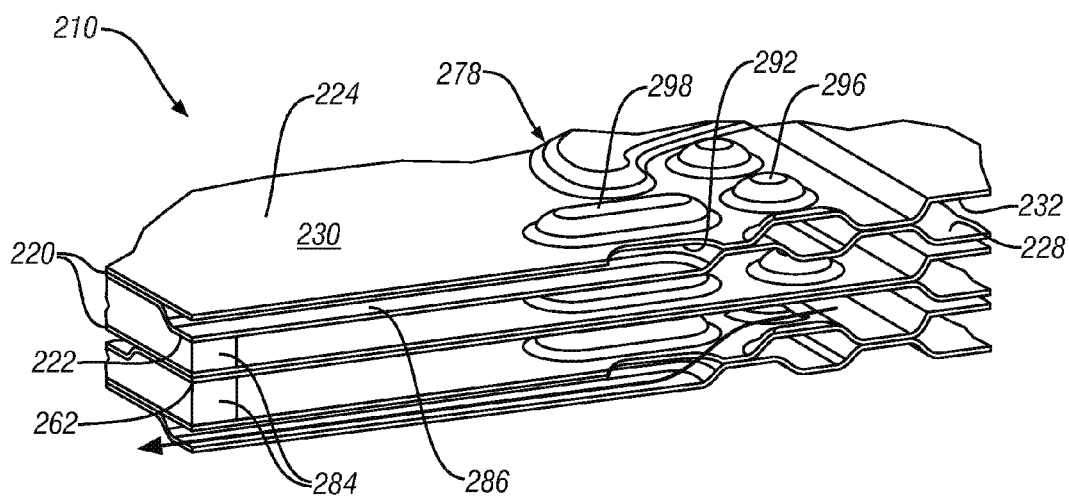
FIG. 9 is a sectioned perspective view of an exemplary fuel cell stack showing a bipolar plate tunnel region, according to another embodiment.

Referring to FIG. 9, a portion of an exemplary fuel cell stack 210 is shown that includes another embodiment of a tunnel region 278. The particular tunnel region shown in this example is shown from the cathode side 224 of bipolar plates 220. Tunnel region 278 may lie between the cathode outlet header opening 262 and cathode gas flow channels of the bipolar plate. In exemplary tunnel region 278, coolant sides 228, 232 of the anode and cathode reactant plates 222, 224 may be disposed generally closely adjacent to and opposing one another. One or more tunnels 286 may be formed in preferably only one of the reactant plates. In the depicted embodiment, tunnels 286 are formed only in the anode plates 222 in the form of elongated dimples, while the adjacent portions of the cathode plates 224 are substantially flat or planar. Of course, the tunnels 286 may alternatively be formed only in the cathode plates 224 or in both plates 222, 224. The arrow shown in FIG. 9 indicates the direction of fluid flow from the reactant flow channel side of the header seals 284 to the header side of the header seals 284 and toward cathode outlet header openings 262 and the corresponding header. However, the same configuration may be utilized in the tunnel region adjacent to the cathode inlet header such that the fluid flow would be in the opposite direction through the tunnel region. Indeed, it may be useful to utilize identical tunnel region configurations adjacent the inlet and outlet headers for symmetry as previously discussed.

As indicated in FIG. 9, the overall shape of tunnels 286 may be similar to those in other disclosed embodiments, such as an elongated dimple. In this embodiment, ports 292 may be formed in the cathode plates 222 to facilitate fluid flow into (or out of) the tunnels 286. Stated another way, ports 292 may facilitate fluid flow from the reactant side 230 of the cathode plate 224 to the coolant side 232 of the cathode plate 224 (or vice versa) and therefore through or beneath the header seals 284. In this embodiment, unlike some previously described embodiments, ports 292 do not transversely cross the tunnels 286. Rather, they are formed in the opposite reactant plate, the cathode plate in this case. Ports 292 may comprise apertures formed through the appropriate reactant plates within the projected area of the opposing tunnels 286. Exemplary tunnel region 278 may also include support features 296, 298. The support features may be in the form of dimples or mounds and have various shapes and sizes, such as small circular features 296 and/or relatively larger elongated or oval features 298, the latter of which may extend between adjacent ports 292. The support features may generally be located near and arranged about the ports 292 and may help minimize or prevent any blockage of the ports by other layers of the fuel cell such as the subgasket, electrolyte membrane, shim, or other component.

In the embodiment of FIG. 9, the tunnel region may still be considered a "straight-through" configuration, even though there may arguably be one elevation change as fluid flows from the reactant side to the coolant side of the reactant plate to make its way into the tunnels 286, because the tunnels 286 proceed straight through the header seals. Even this embodiment that includes a single elevation change may be an improvement over prior known tunnel regions that typically include multiple elevation changes to get fluids from one side of the header seal to the other. As such, this embodiment of FIG. 9 includes many of the advantages and uses of the other straight-through tunnel configurations disclosed herein, such as minimized pressure losses, minimized water pinning points, and reduced overall tunnel region size in length and height, to name a few.

In one embodiment, all of the tunnel regions included in a given bipolar plate include tunnels formed on only one side of the bipolar plate, for example in only one of the anode or cathode reactant plates. For example, all of the tunnel regions included in a given bipolar plate assembly may include tunnels formed only in the anode reactant plate. In particular, a tunnel region embodiment such as that depicted in FIG. 6 may be included adjacent the anode inlet and outlet headers and header openings, and a tunnel region embodiment such as that depicted in FIG. 9 may be included adjacent the cathode inlet and outlet headers and header openings. In such an arrangement, where all of the tunnels in the various tunnel regions of the bipolar plate are formed in only one of the reactant plates of the bipolar plate, header seals are greatly simplified because a seal may be applied to a single side of each bipolar plate. For example, where a CIP seal is utilized, it may be applied across the tops of all of the tunnels by applying it to a single side of the bipolar plate assembly. In the embodiment just described, where the tunnels are all formed in the anode reactant plate, the CIP seal may be applied only on the anode side of the bipolar plate, for example. Of course, all tunnels could alternatively be formed in the cathode reactant plate instead to achieve the same advantages.

The above description of embodiments of the invention is merely exemplary in nature and, thus, variations thereof are not to be regarded as a departure from the spirit and scope of the invention.

What is claimed is:

1. A product comprising:
   a fuel cell stack comprising a plurality of adjacent bipolar plates and a reactant header, the reactant header comprising a first header opening in each of the bipolar plates and a header seal disposed between each adjacent bipolar plate and circumscribing each of its adjacent first header openings, wherein each bipolar plate further comprises reactant flow channels and a first tunnel region fluidly connecting the reactant flow channels and the reactant header and wherein at least one of the first tunnel regions comprises a straight-through tunnel extending straight through the header seal.

2. The product of claim 1, wherein each header seal of the reactant header is aligned with one another in the stack direction.

3. The product of claim 1, wherein the reactant header is an anode inlet header or a cathode inlet header and the fuel cell stack further comprises a corresponding anode outlet header or cathode outlet header, the outlet header comprising a second header opening in each of the bipolar plates and a header seal disposed between each adjacent bipolar plate and circumscribing each of its adjacent second header openings, wherein each bipolar plate further comprises a second tunnel region fluidly connecting the reactant flow channels and the outlet header, and wherein at least one of the second tunnel regions comprises a straight-through tunnel.

4. The product of claim 3, wherein the first and second tunnel regions within each bipolar plate are substantially identical to one another.

5. The product of claim 3, wherein each bipolar plate is symmetric so that it may be rotated 180 degrees in the plane of the bipolar plate when placed in the fuel cell stack without changing the structure of the fuel cell stack.

6. The product of claim 3, wherein the reactant headers are anode headers, the reactant flow channels are anode flow channels, and the fuel cell stack further comprises:
 a cathode inlet header comprising a third header opening in each of the bipolar plates and a header seal disposed between each adjacent bipolar plate and circumscribing each of its adjacent third header openings; and
 a cathode outlet header comprising a fourth header opening in each of the bipolar plates and a header seal disposed between each adjacent bipolar plate and circumscribing each of its adjacent fourth header openings;
 wherein each bipolar plate further comprises cathode flow channels and a third and forth tunnel region fluidly connecting the cathode flow channels to the cathode inlet header and the cathode outlet header, respectively, at least one of each of the third and fourth tunnel regions comprising a straight-through tunnel.

7. The product of claim 6, wherein each bipolar plate comprises an anode reactant plate and a cathode reactant plate and all of the tunnels are formed in only one of the reactant plates.

8. The product of claim 6, wherein each bipolar plate comprises an anode reactant plate and a cathode reactant plate, and wherein the tunnels of the tunnel regions that fluidly connect the anode headers to the anode gas flow channels are formed in the anode reactant plate and the tunnels of the tunnel regions that fluidly connect the cathode headers to the cathode gas flow channels are formed in the cathode reactant plate, so that there is no elevation change when fluid flows through each tunnel region during operation of the fuel cell stack.

9. The product of claim 6, wherein the seals of each of the headers are aligned with one another in the stack direction.

10. The product of claim 6, wherein each tunnel region comprises a plurality of straight-through tunnels and the tunnels of adjacent bipolar plates in the stack are either aligned or staggered in relation to one another in the stack direction.

11. The product of claim 1, wherein one or more of the bipolar plates comprises stamped anode and cathode reactant plates arranged in a nested configuration.

12. A product comprising:
 a bipolar plate comprising stamped anode and cathode reactant plates, each reactant plate comprising reactant flow channels and a header opening aligned with the header opening of the other reactant plate, the bipolar plate further comprising a tunnel region located between the aligned header openings and the reactant flow channels, the tunnel region comprising one or more tunnels, wherein all of the tunnels of the bipolar plate are formed in only one of the reactant plates.

13. The product of claim 12, wherein each tunnel is configured to allow fluid flow straight-through a header seal in a fuel cell stack, between a fuel cell stack reactant header and a port formed through one of the reactant plates in the corresponding tunnel region.

14. The product of claim 13, wherein each port that is formed through the same reactant plate as all of the tunnels is located at an end of the tunnel nearest the reactant flow channels or is located between ends of the tunnel.

15. The product of claim 14, wherein each port that is formed through the same reactant plate as all of the tunnels transversely crosses the tunnel and extends in the reactant plate beyond width of the tunnel.

16. The product of claim 13, wherein at least one port that is formed through the same reactant plate as all of the tunnels is located at an end of the tunnel nearest the reactant flow channels, and the end comprises an enlarged portion.

17. The product of claim 13, wherein the bipolar plate comprises an anode header opening, a cathode header opening, anode flow channels, cathode flow channels, a tunnel region located between the anode header opening and the anode flow channels, and a tunnel region located between the cathode header opening and the cathode flow channels, wherein the ports of the tunnel region located between the anode header opening and the anode flow channels are formed through the anode reactant plate, and the ports of the tunnel region located between the cathode header opening and the cathode flow channels are formed through the cathode reactant plate.

18. The product of claim 13, wherein the bipolar plate further comprises a support feature located adjacent at least one port to help prevent other fuel cell components from blocking the at least one port.

* * * * *